United States Patent [19]

Yap et al.

[11] 4,249,971
[45] Feb. 10, 1981

[54] PROCESS FOR MAKING ELASTOMERIC HOSE

[75] Inventors: Crescencio T. Yap; Leonard Castelbaum, both of Mansfield, Ohio

[73] Assignee: Amerace Corporation, New York, N.Y.

[21] Appl. No.: 33,253

[22] Filed: Apr. 25, 1979

Related U.S. Application Data

[63] Continuation of Ser. No. 634,264, Nov. 21, 1975, abandoned.

[51] Int. Cl.³ .................. B32B 31/30; B32B 33/00; F16L 11/04; F16L 11/08
[52] U.S. Cl. .................. 156/143; 138/124; 138/126; 138/137; 138/153; 138/DIG. 9; 156/149; 156/244.13
[58] Field of Search .................. 156/143, 149, 244.13; 138/124, 126, 137, 141, 153, DIG. 9; 264/45.9, 46.1, 54, 171, 172, 173, 176 R, 209, 211

[56] References Cited

U.S. PATENT DOCUMENTS

| 3,547,162 | 12/1970 | Schaerer | 138/126 |
| 3,586,558 | 6/1971 | Galloway et al. | 156/149 |
| 3,824,141 | 7/1974 | Miller et al. | 156/143 |
| 3,881,521 | 5/1975 | Johansen et al. | 138/126 |

FOREIGN PATENT DOCUMENTS

| 1083303 | 9/1967 | United Kingdom | 138/DIG. 9 |
| 1164934 | 9/1969 | United Kingdom | 138/126 |

*Primary Examiner*—Caleb Weston
*Attorney, Agent, or Firm*—Richard A. Craig; Gregory J. Battersby; Ken Richardson

[57] ABSTRACT

Elastomeric hose having relatively low thermal conductivity is provided comprising an outer tubular cover vulcanized to an inner tube, the outer cover being radially expanded and having a cellular or porous network formed therein. A braided or knitted reinforcing layer may be provided between the radially expanded cellular cover and the inner tube with the former being bonded or vulcanized to the latter through the interstices of the reinforcing layer. The elastomeric hose may be formed by a process wherein a first forming composition, including a thermosetable elastomer, is extruded to form an uncured inner tube which is then simultaneously introduced into a cross-head extruder with a second, separately prepared, forming composition including a thermosetable elastomer and a blowing agent. The second forming composition is extruded about the uncured inner tube to form the uncured hose structure of the present invention which is then vulcanized in a fluidized bed cure system at atmospheric pressure and at a temperature above about 350° F.

10 Claims, 3 Drawing Figures

PROCESS FOR MAKING ELASTOMERIC HOSE

This is a continuation of application Ser. No. 634,264, filed Nov. 21, 1975 now abandoned.

BACKGROUND OF THE INVENTION

The present invention relates generally to elastomeric hose and a process for manufacturing same and, more particularly, to elastomeric hose having relatively low thermal conductivity.

Low thermally conductive elastomeric hose is generally desirable in applications where a relatively high thermal gradient exists between the temperature of the fluid being carried in the hose and the temperature of the surrounding environment. For example, elastomeric hose having a low thermal conductivity is used to transmit heated water to undersea divers to heat their diving suits. In such applications, the temperature of the heated water may be above about 100° F. while the temperature of the surrounding water may be below 40° F. If hose other than low thermally conductive hose were employed, the heated water would be quickly cooled to an essentially inoperative temperature.

Other applications for low thermally conductive hose include the transmission of a cooled fluid in a heated environment. Examples of such applications include hose used to transmit the coolant in automobile air conditioning systems and hose used to carry cold water in water-cooled machinery. In those instances when hose other than low thermally conductive hose is used, vapor tends to condense on the outside of the hose cover or outer jacket.

Heretofore, in order to provide elastomeric hose having a low thermal conductivity it was necessary to provide hose with a relatively thick outer elastomeric cover. This correspondingly increased the weight and the cost of the hose while decreasing its flexibility. Other methods of providing a low thermally conductive hose include the use of an external cover fitted about and/or adhesively bonded to a hose body which, while concededly, proving to be a good insulator, also increased the weight and cost of the hose while significantly decreasing its flexibility.

Recently, some low thermally conductive thermoplastic hose has been manufactured having a radially expanded cellular outer cover. An example of such thermoplastic hose is described in U.S. Pat. No. 3,547,162 to Andre Jacques Schaerer. In use however, such hose is less desirable than thermoset hose due to the marked decrease in flexibility at low temperatures and the low heat distortion points of most thermoplastic materials.

Against the foregoing background, it is a primary objective of the present invention to provide an elastomeric hose having relatively low thermal conductivity.

It is another objective of the present invention to provide an improved reinforced vulcanized hose having a radially expanded, cellular outer cover.

It is an additional object of the present invention to provide an elastomeric hose which remains flexible at low temperatures and which is resistant to heat deformation at elevated temperatures.

It is yet still another object of the present invention to provide a reinforced hose including a radially expanded elastomeric cover having a cellular network formed therein vulcanized to an inner tube.

SUMMARY OF THE PRESENT INVENTION

To the establishment of the foregoing objects and advantages, the present invention breifly comprises a low thermally conductive thermoset, elastomeric hose which includes an inner tube vulcanized to a radially expanded elastomeric cover having a cellular network formed therein. A reinforcing layer such as, for example, a textile layer spirally wrapped or braided about the inner tube, may be provided and, when a reinforcing layer is provided, the cover is vulcanized to the inner tube through the interstices of the reinforcing layer.

The elastomeric hose of the present invention may be formed by a process wherein two forming compositions are admixed in separate conventional mixers. The first forming composition, which includes a thermosetable elastomer, is extruded to form an uncured inner tube which is then introduced into a cross-head extruder simultaneously with the admixed second forming composition, which latter includes a thermosetable elastomer and a blowing agent. A reinforcing layer may be wrapped about the uncured inner tube prior to its introduction into the cross-head extruder. The cross-head extruder extrudes the second forming composition into a cover about the reinforced tubular structure, thus forming the hose structure of the present invention in its uncured state. The uncured hose structure is then vulcanized in a fluidized bed cure system at atmospheric pressure and at a temperature above about 350° F.

BRIEF DESCRIPTION OF THE DRAWINGS

The foregoing and still other objects and advantages of the present invention will be more apparent from the following detailed explanation of the invention in connection with the accompanying drawings wherein.

DESCRIPTION OF THE PREFERRED EMBODIMENT

Figure 1:
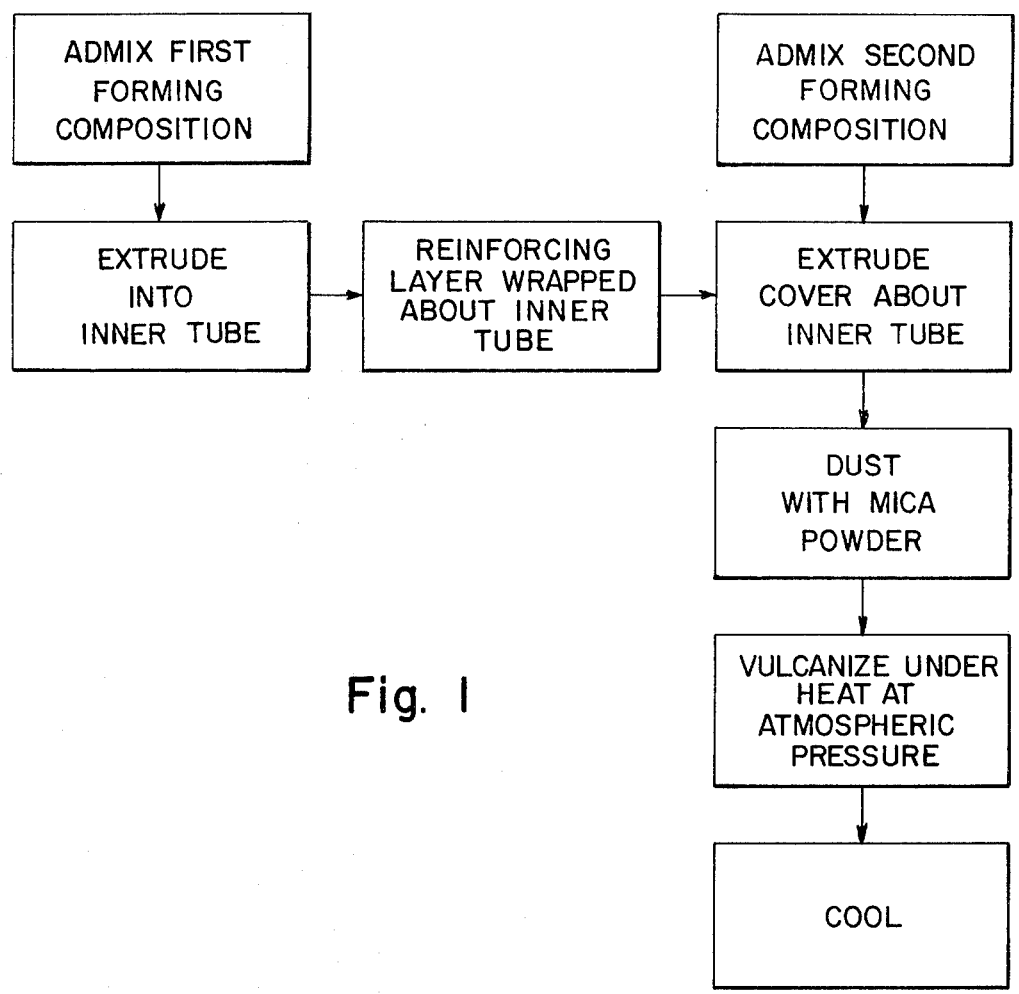
FIG. 1 schematically illustrates the process of forming the elastomeric hose of the present invention.
Figure 2:
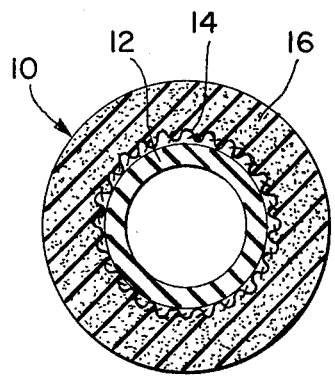
FIG. 2 illustrates in side view the elastomeric hose of the present invention.
Figure 3:
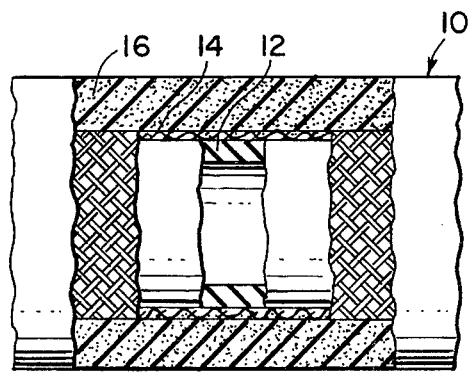
FIG. 3 is a sectional view taken along line 3—3 of FIG. 2.

The elastomeric hose of the present invention referred to generally by reference numeral 10 as shown in FIGS. 2 and 3, may be manufactured in accordance with the preferred process shown schematically in FIG. 1.

It will be observed that initially two separate forming compositions are prepared by admixture. The first composition is for forming the inner tube 12 and the second forming composition is for forming the outer tube or cover 16.

The first forming composition for forming the inner tube preferably is composed of the following ingredients:

thermosetable elastomer;
filler materials;
plasticizer;
curative blend;
desiccant; and
processing aids.

The thermosetable elastomer may be virtually any thermosetable elastomer or a blend of different thermosetable elastomers which are resistant to heat deformation at temperatures below about 250° F. A preferred thermosetable elastomer is an ethylene/propylene terpolymer (referred to generally as EPDM rubber), such as, for example, the EPDM elastomers marketed by Exxon Chemical Company, Uniroyal Chemical Company, E. I. du Pont de Nemours, Inc. and Copolymer Rubber and Chemical Corp.

The first forming composition for forming the inner tube should include the thermosetable elastomer in an amount by weight of the total composition of at least about 10% with a preferred amount being within the range of about 15% to about 30% based upon the total weight of the forming composition. A particularly preferred amount of thermosetable elastomer in the first forming composition is within the range of about 16% to about 20% by weight of the total composition.

Filler materials should preferably be included in the first forming composition to both reduce the amount of elastomer and thus the ultimate cost of the product and to improve certain physical properties of the resultant vulcanized inner tube, particularly its hardness and strength. Examples of such filler materials, which may be added alone or in combination, are carbon black, pulverized coal, hard and soft clay and mineral fillers such as, for example, metallic silicates.

The use of carbon black or a blend of carbon blacks is a preferred filler material, particularly the carbon blacks manufactured in accordance with ASTM specifications N-650, D-774 and N-990 such as, for example, the carbon blacks marketed by Cabot Corp., Ashland Chemical Co. and R. T. Vanderbilt Co. Carbon black should be included in the first forming composition in an amount within the range of about 45% to about 65% by weight of the first forming composition with a preferred amount being within the range of about 50% to about 55% by weight.

Pulverized coal is another preferred filler material and may be included in amounts up to about 4% by weight of the first forming composition. Hard and soft clay may also be used as filler materials, particularly to increase the stiffness of the resultant vulcanized inner tube and, when so included, may be added in an amount up to about 30% by weight of the first forming composition.

A plasticizer, preferably a plasticizer having a flash point above about 400° F., may also be included to provide a more elastic inner tube as well as aiding in its processing. Preferred plasticizers may be selected from the group consisting of naphthenic type, paraffinic type and aromatic type oils. Particularly preferred plasticizers include the paraffinic type oil marketed by Sun Oil Company and the aromatic type oil also marketed by Sun Oil Company. The plasticizer may be included in the first forming composition in an amount within the range of about 15% to about 32% by weight of the total composition with an amount in the range of about 20% to about 25% being preferred.

A curative system consisting of a vulcanizing agent, an accelerator and an activator should also be included in the first forming composition to effect vulcanization of the rubber elastomer. Preferred vulcanizing agents include sulfur or sulfur donor compounds and preferred accelerators may be selected from the group consisting of thiazole, dithiocarbamate and thiuram accelerators. Accelerators selected from the group consisting of copper salt thiazole, zinc dibutyl dithiocarbamate, ainc dimethyl dithiocarbamate, tetramethyl thiuram disulfide dithiomorpholine, dibutyl phosophorodithionate and zinc phosphorous dithionate are particularly preferred. Preferred activators may be selected from the group consisting of zinc oxide and maleimide activators. A particularly preferred activator is the phenylenedimaleimide activator marketed by E. I. duPont de Nemours, Inc.

The curative system may comprise up to about 5% by weight of the first forming composition with an amount in the range of about 1% to about 3% by weight being preferred. The vulcanizing agent may comprise up to 100% by weight of curative system with a preferred amount being in the range of about 5% to about 10% by weight of the curative system. The accelerator or blend of accelerators may comprise up to about 60% by weight of the total curative system with a preferred amount being in the range of about 35% to about 45% by weight of the total curative system. The activator or blend of activators may comprise up to about 70% by weight of the total curative system with a preferred amount being in the range of about 50% to about 60% by weight of the total curative system.

A desiccant may also be included in the first forming composition to remove any residual moisture. A preferred desiccant is a calcium oxide dispersion such as, for example, Desical P marketed by Basic Chemical Corp. The desiccant may comprise up to about 3% by weight of the first forming composition with a preferred amount being within the range of about 1% to about 2% by weight.

A blend of processing aids may also be included in the first forming composition to aid in the handling of the composition and in extrusion of the inner tube. Preferred processing aids may be selected from the group consisting of stearic acid, paraffin wax, low molecular weight ethylene glycol, low molecular weight polyethylene and internal lubricants. A particularly preferred low molecular weight polyethylene is marketed by Allied Chemical Co. and a particularly preferred low molecular weight ethylene glycol is marketed by Union Carbide. A particularly preferred internal lubricant is a rubber compatible lubricant.

The processing aid or blend of processing aids should comprise up to about 3% by weight of the first forming composition with a preferred amount being in the range of about 1% to about 2% by weight of the total composition. Stearic acid may comprise up to about 100% by weight of the blend of processing aids with a preferred amount being in the range of about 20% to about 30% by weight of the entire blend of processing aids. Paraffin wax may comprise up to about 100% by weight of the blend of processing aids and a preferred amount of paraffin wax is in the range of about 35% to about 45% by weight of the entire blend. The low molecular weight polyethylene may also comprise up to about 100% by weight of the total blend with a preferred amount being in the range of about 35% to about 45% by weight of the total blend. Low molecular weight ethylene glycol and an internal lubricant may each be included in amounts up to about 100% by weight of the total blend.

The forming composition described above may be processed into the uncured inner tube by admixing the constituent ingredients in a conventional Banbury type mixer at a temperature between about 200° F. and about 270° F., rolling the admixed forming composition into a flat sheet, then introducing it into a cold feed, vacuum-vented, long screw extruder ad extruding it at a temperature of about 230° F. into an uncured, inner tube. A suitable cold feed, vacuum-vented, long screw extruder is manufactured by NRM Corporation.

Preferably, a reinforcing layer is then wrapped about the exterior of the inner tube by passing it through a conventional reinforcing machine such as, for example, a knitting, wrapping, or braiding machine. To facilitate the application of the reinforcing layer, the interior of the inner tube may, if desired, be maintained under a positive pressure, for example, by the application of compressed air through the center of the inner tube as it is well known in the art. Virtually any type of reinforcing layer may be used, although a textile material spirally wrapped or braided about the uncured inner tube is preferred. Particularly preferred reinforcing materials include, for example, synthetic textiles such as polyester, rayon and nylon.

The uncured inner tube is then introduced into a cold feed, vacuum-vented, long screw, crosshead extruder simultaneously with the admixed second forming composition. A suitable cross-head extruder is manufactured by NRM Corporation.

The second forming composition used to form the radially expanded outer cover or jacket, preferably is composed of the following ingredients:
  thermosetable elastomer;
  filler materials;
  plasticizer;
  curative blend;
  desiccant;
  processing aids; and
  blowing agent.

The second forming composition for forming the outer cover should include a thermosetable elastomer or blend of thermosetable elastomers which, after vulcanization, are resistant to heat deformation at temperatures below about 250° F. Preferred elastomers include the EPDM terpolymers marketed by Exxon Chemical Company, Uniroyal Chemical Company, E. I. duPont de Nemours, Inc. and Copolymer Rubber and Chemical Corp. The elastomer or blend of elastomers should make up at least about 20% by weight of the second forming composition with a preferred amount being within the range of about 28% to about 32% by weight of the total composition.

Filler materials are preferably included in the second forming composition and may include, for example, carbon black, pulverized coal, hard and soft clay and mineral fillers such as metallic silicates either separately or in combination. Carbon black or a blend of carbon blacks are preferred filler materials and, in particular, the carbon blacks manufactured in accordance with ASTM specifications N-650 and N-990. The filler materials may comprise at least about 30% by weight of the second forming composition with an amount within the range of about 35% to about 40% by weight being preferred.

The plasticizer or plasticizers included in the second forming composition should have a flash point above about 400° F. and may be selected from the group consisting of naphthenic type, paraffinic type and aromatic type oils. Preferred paraffinic type oils and preferred aromatic type oils are marketed by Sun Oil Company. The plasticizer should be included in an amount up to about 30% by weight of the second forming composition with a preferred amount being within the range of about 20% to about 25% by weight.

A curative system should be included in the second forming composition, preferably comprising a vulcanizing agent, an accelerator and an activator. As in the first forming composition previously discussed, sulfur and sulfur donor compounds are preferred vulcanizing agents and the preferred accelerator or blend of accelerators may be selected from the group consisting of thiazole, dithiocarbamate and thiuram accelerators. Accelerators selected from the group consisting of mercaptobenzothiazole, zinc dimethyl dithiocarbamate and tetramethyl thiuram monosulfide are particularly preferred. The preferred activator or blends of activators may be selected from the group consisting of zinc oxide and maleimide activators and a particularly preferred activator is a phenylene dimaleimide activator such as, for example, the dimaleimide activators marketed by E. I. duPont de Nemours, Inc. The curative system should be included in the second forming composition in an amount up to about 4% by weight of the total forming composition with an amount in the range of about 2.5% to about 3.5% by weight being preferred. The vulcanizing agent may comprise up to 100% by weight of the total curative system with a preferred amount being in the range of about 10% to about 20% by weight of the total curative system. The accelerator ingredient may comprise up to about 50% by weight of the total curative system with a preferred amount being in the range of about 20% to about 30% by weight of the curative system. The activator ingredient may comprise up to about 70% by weight of the curative system with an amount in the range from about 55% to about 65% by weight of the total curative system being preferred.

A desiccant, preferably a calcium oxide dispersion such as, for example, Desical P marketed by Basic Chemical Corp. may be included in an amount up to about 3% by weight of the second forming composition to absorb any residual moisture. The addition of a desiccant, in an amount in the range of about 1.5% to about 2.5% by weight of the total composition, is preferred.

A blend of processing aids may also be included in the second forming composition to improve the processability of the compound and to aid in its extrusion. Processing aids selected from the group consisting of stearic acid, paraffin wax, low molecular weight ethylene glycol, low molecular weight polyethylene and an internal lubricant are preferred. A particularly preferred low molecular weight ethylene glycol is marketed by Union Carbide and a particularly preferred low molecular weight polyethylene is marketed by Allied Chemical Co. A rubber compatible internal lubricant is particularly preferred. The processing aids may comprise up to about 4% by weight of the total second forming composition with a preferred amount being within the range of about 1.5% to about 3% by weight of the total composition. Stearic acid may be included as a processing aid in an amount up to about 100% by weight of the total processing aids with an amount in the range of from about 10% to about 15% by weight of the total processing aids being preferred. Paraffin wax, low molecular weight ethylene glycol and an internal lubricant may each be included in amounts up to about 100% by weight of the total processing aids with a preferred amount for each being in the range of about 25% to about 35% by weight of the total processing aids. Low molecular weight polyethylene may be included in an amount up to about 100% by weight of the total processing aids.

In accordance with the invention, a blowing agent is also included in the second forming composition for the purposes of expanding the hose outer cover and forming a cellular or porous network within the outer cover during vulcanization thereof. Preferred blowing agents may be selected from the group consisting of dinitrosopentamethylene tetramine, azo dicarbonamide and azo bisformamide and, in particular, the dinitrosopentamethylene tetramine, azo dicarbonamide and azo bisformamide and in particular, the dinitrosopentamethylene tetramine marketed by DuPont under the trademark UNICEL; the azo dicarbonamide marketed by Uniroyal under the trademark CELOGEN; and the azo bisformamide marketed by National Polychem Corp. under the mark KEMPORE.

The amount of blowing agent included in the forming composition is not critical and is dependent merely upon the degree of expansion and cellular formation or porosity desired. Satisfactory results are achievable when the blowing agent is included in the second forming composition in an amount up to about 7% by weight of the composition with a preferred amount in the range of about 2% to about 6% by weight of the composition. In the preferred embodiment, the ingredients comprising the second forming composition for the radially expanded outer cover are admixed in a conventional internal mixer at a temperature between about 200° F. and about 270° F., rolled into a flat sheet and then fed into the cold feed, vacuum vented, long screw, cross-head extruder simultaneously with and at a perpendicular angle to the uncured inner tube. The cross-head extruder operating at a temperature between about 190° F. and about 230° F., extrudes the second forming composition about the uncured inner tube which, in the preferred embodiment of the present invention, includes a reinforcing layer to form a reinforced uncured hose.

The uncured hose is removed from the cross-head extruder by a twin belt puller device such as, for example, the Take-Off Machine manufactured by Farris Universal and may then be vulcanized. Since the outer cover or jacket of the hose must be allowed to expand radially with reference to the longitudinal axis of the hose during vulcanization, the latter should be carried out in a system where no positive pressure or external constraint is applied against the hose outer cover. A fluidized bed cure system is preferred inasmuch as it is capable of effecting vulcanization under conditions of atmospheric pressure and at a relatively rapid rate.

The use of such a system furthermore permits controlled radial expansion of the hose outer cover and the formation of a smooth external surface or skin on the radially expanded cover.

When a fluidized bed cure system is employed, the uncured hose is preferably covered with a dust or powder, preferably mica dust, prior to vulcanization. To facilitate this, the uncured hose is passed through a dusting unit before introduction into the cure unit where mica dust is sprayed over the exterior of the uncured hose. The hose is then introduced into the fluidized bed where glass beads are maintained in constant or fluidized motion by currents of air injected from around the sides of the trough shaped unit. The unit is divided into three temperature zones, the temperature of the first zone being maintained within the range of from about 350° F. to about 400° F., the temperature of the second zone being maintained within the range from about 375° F. to about 425° F. and the temperature of the third zone being maintained within the range from about 400° F. to about 450° F. The pressure of the fluidized bed unit is maintained at essentially atmospheric pressure. Positive pressure is introduced through the center of the inner tube during vulcanization to insure that there will be no internal collapse of the inner tube.

As the vulcanized hose exits from the fluidized bed cure unit it is cooled by passing it through a water spray which also serves to remove any excess glass beads. The water temperature of this water spray is preferably maintained at about 50° F.

The resultant hose, in its preferred embodiment as shown in FIGS. 2 and 3, has an inner tube 12 directly cross-linked and thus integrally bonded to a radially expanded outer cover or jacket 16 through the interstices of a reinforcing layer 14. It will be appreciated that due to this direct cross-linking between the inner tube 12 and the expanded porous outer cover 16, the hose 10 possesses excellent strength and adhesion characteristics. Further, it is noted that use of a blowing agent in the second molding composition and a relatively rapid cure cycle in the fluidized bed cure unit produces a hose wherein the outer cover is radially expanded to a thickness at least twice the thickness of the relatively solid wall of the inner tube 12. Additionally, the relatively rapid cure produces a generally smooth outer surface. The increased thickness of the expanded cover 16, in combination with the cellular network formed therein which includes pockets of trapped gas, provides a hose structure having an extremely low thermal conductivity, thereby affording excellent thermal insulation for the fluid being carried within the inner tube 12.

Further, it will be appreciated that the hose 10, being thermoset, is resistant to heat deformation at temperatures of at least 250° F. and remains flexible at temperatures of below 0° F., thus rendering it a generally more desirable hose than similar thermoplastic hoses.

The following examples serve to further illustrate the present invention and are not construed as limiting the scope of the invention.

EXAMPLE I

In order to more fully illustrate the preparation of hose according to the invention, two separate forming compositions were prepared, the first forming composition for forming the inner tube and the second composition for forming the radially expanded outer cover. The two compositions were composed of the following ingredients with their respective weights being specified as a percentage of the total weight of the composition:

| First Forming Composition | |
|---|---|
| Ingredients | Percentage by Weight |
| EPDM elastomer | 17.6% |
| carbon black filler | 53.8% |
| paraffinic oil | 23.3% |
| curative blend | 2.7% |
| calcium oxide dispersion | 1.2% |
| stearic acid | 0.34% |
| paraffin wax | 0.52% |
| low molecular weight polyethylene | 0.52% |

| Second Forming Composition | |
|---|---|
| Ingredients | Percentage by Weight |
| EPDM elastomer | 3.6% |
| carbon black filler | 38.3% |
| paraffinic oil | 21.5% |
| curative blend | 3.1% |
| calcium oxide dispersion | 1.5% |
| stearic acid | 0.2% |
| paraffin wax | 0.6% |
| low molecular weight ethylene glycol | 0.6% |

| -continued | |
|---|---|
| dinitrosopentamethylene tetramine | 3.0% |

The first forming composition was admixed in a Banbury mixer at a temperature of about 250° F., rolled into a flat sheet and extruded at a temperature of about 230° F. into an uncured tubular structure using a cold feed, vacuum vented, long screw extruder marketed by NRM Corp. After extrusion, the uncured inner tube was passed through a textile braiding machine wherein a reinforcing layer of polyester material was braided about the inner tube. The reinforced inner tube, still in an uncured state, was then introduced into a cold feed, vacuum-vented, long screw, cross-head extruder marketed by NRM Corp. simultaneously with the second forming composition which had been admixed in a Banbury mixer at a temperature of about 250° F., and the second forming composition was extruded, at a temperature of about 230° F., about the uncured and reinforced inner tube to form a composite uncured hose structure having an inner tube encased by a textile reinforcing layer and by an outer cover. The uncured hose was then introduced into a three temperature zoned fluidized bed cure unit and vulcanized in stages at zone temperatures of about 380° F., about 400° F. and about 420° F.

After cooling by passing the hose through a water spray, the temperature of the water being maintained at about 50° F., the resultant thermoset hose included a solid walled, elastomeric inner tube having an inner diameter of about 0.78 inches which was integrally bonded through the interstices of a polyester reinforcing layer to a radially expanded, cellular elastomeric outer layer or cover having an outer diameter of about 1.5 inches. The hose exhibited the following physical properties:

| Inner Tube | |
|---|---|
| tensile strength | 973 psi |
| ultimate elongation | 300% |
| hardness (Durometer Shore A) | 65 |
| adhesion | 20 ppi |
| Expanded Outer Cover | |
| tensile strength | 500 psi |
| ultimate elongation | 312% |
| hardness (Durometer Shore OO) | 85 |
| adhesion | 20 psi |
| Integrally Bonded Hose | |
| burst strength | 890 psi |

It is noted that in order to obtain the physical data with respect to the inner tube, the outer cover was cut away in a certain area in order to provide access to the inner tube. The above physical data indicate a hose possessing outstanding physical properties particularly one with an excellent bond between the expanded cover and the inner tube.

EXAMPLE II

In order to demonstrate the effects of exposure of the hose of Example I to prolonged heat, it was subjected to a temperature of about 250° F. for a continuous period of seventy (70) hours with the following results:

| Inner Tube | | % Change |
|---|---|---|
| tensile strength | 1356 psi | +39% |
| ultimate elongation | 125% | −58% |
| hardness (Durometer Shore A) | 79 | +14 |
| Expanded Cover | | |
| tensile strength | 590 psi | +18% |
| ultimate elongation | 162% | −48% |
| hardness (Durometer Shore OO) | 92 | +7 |

This physical data indicated that the hose, after exposure, was generally stronger although less flexible than the hose which had not been similarly exposed. The results are, however, generally indicative of a hose which has experienced only a limited degree of heat deformation and which is still commercially acceptable.

EXAMPLE III

The hose of Example I was subjected to hydrostatic testing wherein internal water pressures of 75 psi, 100 psi and 150 psi, respectively, were introduced into and passed through the inner tube of the hose. The following physical changes were observed:

| Expansion of Outer Diameter | |
|---|---|
| (a) 75 psi | +2.6% |
| (a) 100 psi | +2.6% |
| (a) 150 psi | +3.6% |
| Change of Length | |
| (a) 75 psi | −1.9% |
| (a) 100 psi | −2.5% |
| (a) 150 psi | −3.1% |

These changes were considered within allowable limits and were generally consistent with commercially acceptable standards.

Although the foregoing Examples illustrate the formation of elastomeric hose having an inner tube vulcanized to a radially expanded outer cover for use in specific applications where the hose must have a low thermal conductivity because of the high thermal gradient between the temperature of the fluid being passed through the inner tube and the temperature of the surrounding environment, it will be appreciated that such a hose may have additional applications. In particular, such hose may be used in those situations where cost is a significant factor. The use of a radially expanded cover having a cellular network formed therein permits the fabrication of hose of a particular dimension which requires less elastomeric material to produce than those having a solid elastomeric cover. Possible applications include, for example, its use in lawn and garden hose. Furthermore, although in the preferred embodiment described above, the outer jacket or cover is extruded in a cross-head extruder about the inner tube prior to vulcanization, it will be appreciated that the outer jacket may be separately extruded or otherwise formed into the outer cover and then subsequently disposed about the inner tube to form the uncured tubular structure. Accordingly, the present invention should be limited only by the true scope of the appended claims.

Wherefore we claim:

1. A process for producing a composite elastromeric hose of one or more thermosetable materials and of reduced thermal conductivity, said hose having an inner tube vulcanized to a radially expanded outermost cover including a porous network formed therein, said process comprising the steps of:

(a) providing a first forming composition for forming said inner tube, said first forming composition including a thermosetable elastomer;
(b) providing a second forming composition for forming said radially expanded outermost cover, said second forming composition including a thermosetable elastomer and a blowing agent;
(c) forming said first forming composition into a first uncured tubular structure;
(d) forming said second forming composition into a second uncured tubular structure;
(e) disposing said second uncured tubular structure about said first uncured tubular structure to form an uncured hose structure of initial transverse external size determined by said second uncured tubular structure; and
(f) vulcanizing said uncured hose structure to form said hose in a heated environment and in the absence of external constraint while activating said blowing agent to expand said second tubular structure radially outwardly to a final transverse external size substantially greater than said initial transverse external size to form said porous network within said outer cover during said vulcanizing thereof.

2. The process of claim 1 wherein the steps of forming said second forming composition into a second uncured tubular structure and disposing said second uncured tubular structure about said first uncured tubular structure are performed simultaneously.

3. The process of claim 1 further comprising the step of applying a reinforcing layer about said first uncured tubular structure prior to disposing said second uncured tubular structure about said first uncured tubular structure.

4. The process of claim 1 wherein the step of providing a first forming composition comprises the steps of admixing the following ingredients:
(a) at least about 10% by weight of the total first forming composition of a thermosetable EPDM elastomer;
(b) at least about 45% by weight of the total first forming composition of filler materials; and
(c) up to about 5% by weight of the total first forming composition of a curative system selected from the group consisting of vulcanizing agents, activators and accelerators.

5. The process of claim 1 wherein the step of providing a second forming composition comprises the steps of admixing the following ingredients:
(a) at least about 20% by weight of the total second forming composition of a thermosetable EPDM elastomer;
(b) at least about 30% by weight of the total second forming composition of filler materials;
(c) up to about 4% by weight of the total second forming composition of a curative system including a vulcanizing agent, an activator and an accelerator; and
(d) up to about 7% by weight of the total composition of a blowing agent.

6. The process of claim 1, wherein during said vulcanizing step said second tubular structure is expanded to a radial thickness at least twice the radial thickness of said first tubular structure.

7. The process of claim 1 wherein the step of forming said first forming composition into a first uncured tubular structure comprises the step of extruding said first forming composition.

8. The process of claim 2 wherein the step of forming said second forming composition into a second uncured tubular structure disposed about said first uncured tubular structure comprises the step of extruding said second forming composition about said first uncured inner tube.

9. The process of claim 1 wherein the step of vulcanizing said uncured hose structure comprises the step of vulcanizing said uncured hose structure under a nonpositive pressure at a temperature in the range from about 350° F. to about 450° F.

10. The process of claim 9 wherein the step of vulcanizing said uncured hose structure comprises the step of passing said uncured hose structure through a fluidized bed maintained at a temperature within said range.

* * * * *